United States Patent [19]

Mensier

[11] 3,844,571

[45] Oct. 29, 1974

[54] SOUND PICK-UP DEVICE FOR PLAYING BACK RECORDS OF SMALL DIAMETERS ON ELECTRIC GRAMOPHONES OR AND OTHER REPRODUCING APPARATUS PROVIDED WITH AUTOMATIC STOP MEANS

[75] Inventor: Alain Mensier, Bois-Colombes, France

[73] Assignee: M. A. V. (Methodes Audio-Visuelles, Paris, France

[22] Filed: Dec. 20, 1972

[21] Appl. No.: 317,065

[52] U.S. Cl. .............................. 274/39 R, 274/9 R
[51] Int. Cl. .............................. G11b 3/60
[58] Field of Search .................. 274/39 R, 9 R, 1 E

[56] References Cited

UNITED STATES PATENTS

| | | | |
|---|---|---|---|
| 2,335,661 | 11/1943 | Gay | 274/39 R |
| 3,181,870 | 5/1965 | Lasswell, Jr. | 274/9 R |
| 3,386,744 | 6/1968 | Kingsbury et al. | 274/39 R |

*Primary Examiner*—Louis R. Prince
*Assistant Examiner*—Charles E. Phillips

[57] ABSTRACT

This invention relates to a pick-up device for playing back disk-shaped records of small diameter, e.g., 4 inches, on a conventional record-player which normally plays back records of larger diameter. A pulley fitted onto the shaft of the turn-table drives by means of a belt, an auxiliary turn-table of smaller diameter than the conventional record player turntable, the auxiliary turn-table being carried by a support arranged for maintaining the grooves of the small-diameter record within the normal range of operation of the pick-up arm.

7 Claims, 2 Drawing Figures

Figure 1:
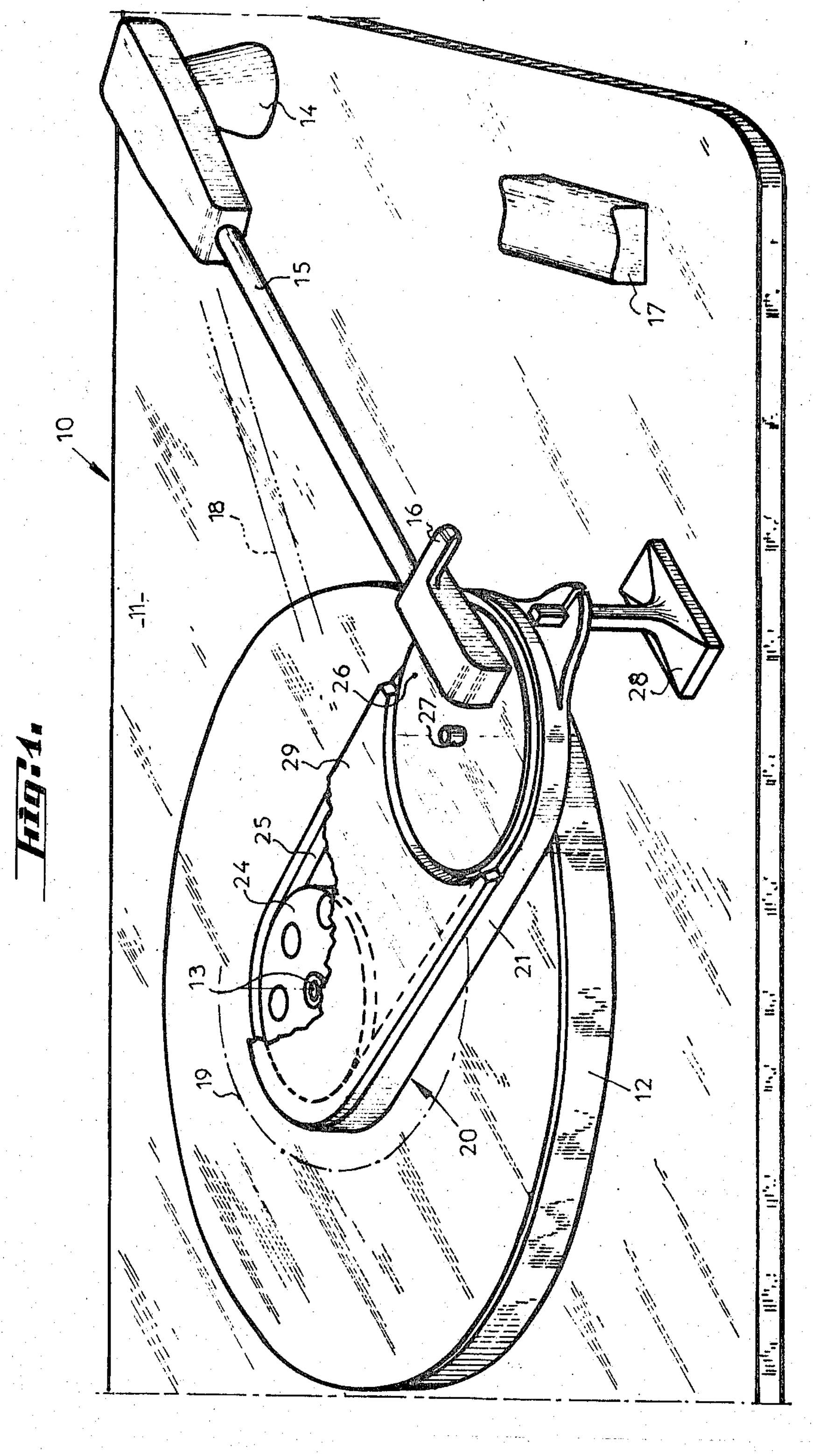

SOUND PICK-UP DEVICE FOR PLAYING BACK RECORDS OF SMALL DIAMETERS ON ELECTRIC GRAMOPHONES OR AND OTHER REPRODUCING APPARATUS PROVIDED WITH AUTOMATIC STOP MEANS

The present invention relates to a pick-up device for reproducing sound from disk-shaped records of small diameters on conventional electrically driven phonographs or record players or other sound reproducing apparatus provided with automatic stop means.

Processes are known for engraving and manufacturing phonographic disk-like records for the production of records of small diameters, at most equal, for example, to 10 cm or 4 inches and generally consist of a thin and flexible annular element formed on either of its opposed faces with one or several zones or areas of microgrooves. Such records can, in spite of their small diameter and their travelling speed beneath the pick-up head, provide good sound reproduction providing playback occurred at the speeds normally used for conventional record players, phonograph or like sound reproducing apparatus available on the market. The playback operation of such small diameter phonographic records cannot, however, be performed on conventional apparatus since the latter are provided with automatic stop means which acts on the arm carrying the pick-up head when the arm arrives at a point which is a determined distance from the axis of the turn-table, i.e., about 4 inches.

Therefore, an object of the present invention is the provision of a device which will permit a play back operation with a phonographic record of small diameter when used with a conventional record-player, phonograph or like sound reproducing apparatus comprising a mounting plate for mounting a turn-table which is rotatably driven by a motor and a swinging pick-up arm the angular displacement of which is limited by automatic stop means at a determined distance from the axis of the turn-table.

The device according to the invention is characterized in that it consists essentially of an auxiliary turntable of diameter smaller than the conventional or or main turn-table by which it is rotatably driven, the auxillary turn-table being held above the conventional turn-table by a removable support in a radial, off center, position, relative to the axis of the conventional turn-table such that the grooves of the record travel in a sector normally swept by the pick-up arm.

Another characteristic feature of the device according to the invention is that the support is pivotally mounted on the shaft of the conventional turn-table and bears, beyond the periphery of the latter on the mounting plate of the apparatus.

It will be apparent from the foregoing characteristic features that the mere addition to a conventional record player or like standard sound reproducing apparatus, of a device according to the invention enables, without further modification, the play back of phonograph records of very small diameters normally made impossible because of the automatic stop mechanism, above referred to, in said apparatus.

According to a preferred embodiment of the invention, the support has the general shape of a plate comprising a bearing through which the shaft of the conventional turn-table freely extends and in which is journalled the hub of a pulley or sheave secured onto said shaft and through which pulley the auxiliary turn-table is rotatably driven, for example, by a straight belt enabling the auxiliary turn-table to be driven in the same direction as the conventional turn-table.

The support advantageously bears upon the mounting plate of the apparatus through the intermediary of a stand, pedestal or like device of adjustable height thereby enabling adjustment of the device to different turn-table heights.

Finally, the support is desirably provided with a cover covering at least said pulley and, when necessary, the free runs of said belt.

Figure 2:
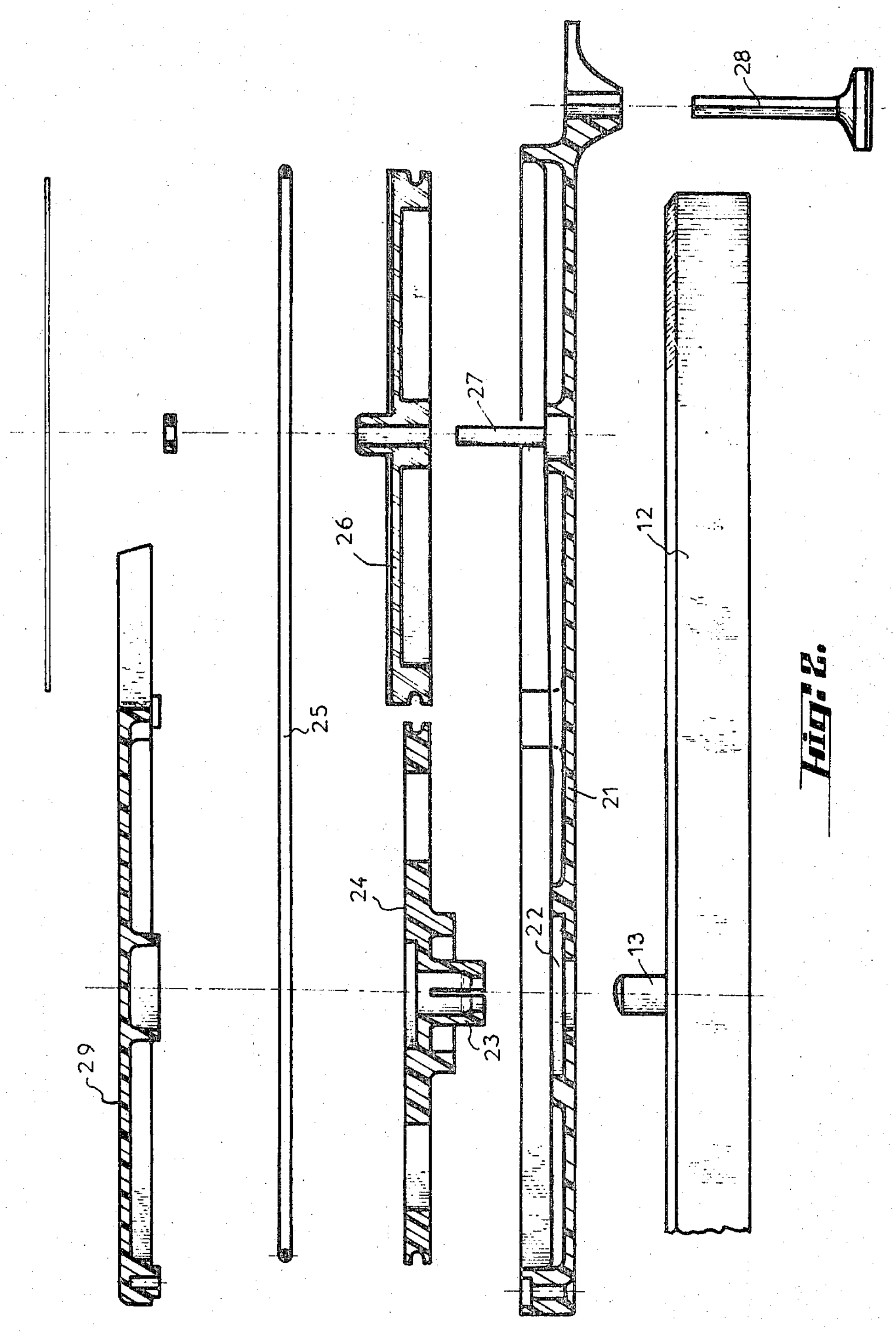

Further features and advantages of the device according to the invention will become apparent when reading the following detailed description of a nonlimiting form of embodiment given by way of example only and illustrated by the accompanying drawings wherein:

FIG. 1 diagrammatically shows a partial perspective view of the platform of a record-playing or like sound reproducing apparatus provided with a device according to the invention shown in partially broken away condition; and FIG. 2 is an exploded axial sectional view of the device of FIG. 1.

The device according to the invention is adapted for association with sound reproducing apparatus for playing back phonograph records as, for example, a portable electric record player. The record-player platform 10 of said apparatus essentially comprises a mounting plate 11 on which is rotating a rotatable turn-table 12; the shaft 13 of the table is rotatably driven by a motor (not shown) located below the mounting plate on which is moreover arranged a swivel portion 14 of a movable arm 15 carrying pick-up head 16 which in its normal rest position at rest is accommodated in a receiver cradle 17 fast with the mounting plate 11.

When playing back a standard phonographic record of conventional diameter on the turn-table 12, the movable arm 15 carried along by the pick-up head 16 follows the groove of the record and is ultimately brought, at the end of the play-back operation into an angular position 18. Automatic stop means (not shown) incorporated into the mechanism of the apparatus is actuated when the movable arm 15 is moved to position 18. The automatic stop means when operated is effective to lift the the arm 15 from the record and permit its return to the cradle 17 and to terminate the rotary drive of the turn-table 12. Accordingly, such apparatus does not permit play back of records having grooves which lie wholly or partially within circumference 19, centered on shaft 13 of the turn-table 12 and tangent to the stylus of the pick-up head 16 at position 18 of the movable arm 15. For presently commercially available apparatus, the diameter of this circumference 19 is usually of 105 millimeters, about 4 inches.

As previously stated, existing processes of engraving and manufacturing phonographic records permit production of records, of good sound reproducing quality having a very small diameter at most equal for example to 10 cm, or 4 inches. These small diameter records because they are thin and flexible can be mailed under ordinary cover.

The addition of the device according to the invention to a conventional reproducing apparatus of the type described enables one to play back such records which would otherwise not be possible:

The device 20 shown by way of example consists essentially of a plate-like support 21 comprising a bearing 22 through which the shaft 13 of the turn-table 12 of the apparatus freely extends and on which is journalled a hub 23 of a pulley or sheave 24 mounted on said shaft 13 and provided with resilient clips or projections enabling rotation of the pulley 24 by the shaft 13.

The pulley 24 drives through a belt 25 an auxiliary turn-table 26 freely journalled on a pin 27 fast with the support 21, the auxiliary turn-table having a diameter corresponding to that of the records it is adapted to receive and being desirably made from a relatively heavy material so as to have a sufficient inertia.

The support or holder 21 moreover comprises, with a view to enabling locking or constraining it against motion at the proper height and in the desired angular position above the turn-table 12, a stand 28 located beyond the periphery of said turn-table and adapted for support upon the mounting plate 11 of the record-player platform 10. As shown, this stand 28 is desirably of adjustable height and consists, for instance, of a pad portion integral with a stem or rod portion received with slight friction fit within a clamp provided at the end of the support 21. The support 21 is moreover desirably provided with a close-fitting cover 29 covering the pulley 24 and the free runs of the belt 25.

The device 20 thus made up may easily be positioned on the record-player platform 10 since it requires only that it be fitted over the shaft 13 of the turn-table 12 and that it be adjusted in angular position and in height by adjustment of the stand 28 to make it operative.

When a record of small diameter has been positioned on the auxiliary turn-table 26 and suitably centered by its pin 27, it is merely necessary to position, by hand or automatically, the pick-up head 16 at the starting point of the groove in the record to enable play back operation. At the end of the play-back operation of the record the pick-up head 16 is manually returned to its cradle 17, the automatic stop mechanism of the apparatus being, owing to its design and without modification thereof, unable to co-operate for this purpose.

The device 20 described and shown is only one of many possible embodiments of the invention. Not only can one select different materials and alter general appearance of the device but the very structure of the device can also significantly be modified. Thus for instance, it is not at all required that the auxiliary turn-table 26 be driven through the medium of a belt by a sheave 24 of the illustrated diameter but such an arrangement is advantageous in that the auxiliary turn-table 26 revolves at the same speed and in the same direction as turn-table; however the pulley 24 could drive by friction the auxiliary turn-table 26 which would then revolve in a direction reversed to that of turn-table 12 and/or pulley 24 could be of a diameter different from that of the auxiliary turn-table 26 which would then revolve at a speed different from that of the turn-table 12. The drive mechanism for the auxiliary turntable 26 could also be modified by mounting the shaft 13 to rotate freely with respect to the turn-table 12 by substituting, for the pulley 24 and the belt 25, a roller rotating about a radial shaft carried by the support 21 between the shafts 13 and 27, such roller engaging on the one hand the surface of turn-table 12 and on the other hand the lower side or bottom face of the auxiliary turn-table 26. Moreover instead of merely mounting stand 28 with light frictional engagement within the clamp portion of the support 21 more elaborate bearing or holding means could be used such as a threaded spindle screw-threaded into a tapped hole in the support 21 and resting upon a thrust-bearing fitted or inserted for this purpose in the desired position on the mounting plate 11.

The invention is therefore not limited to the specific embodiment described and shown which has been illustrated by way of example only. The invention comprises all the means constituting technical equivalents to those described and shown considered separately or in combinations and used within the scope of the appended claims.

What is claimed is:

1. In combination with a standard record player including a mounting plate through which extends an axle rotatable about a predetermined axis, a turn-table rotatably mounted on said axle, a pick-up arm adapted to sweep a sector of said turn-table and automatic stop means effective to terminate rotation of said axle when said pick-up is a predetermined distance from said axis, a device for playing back a phonograph record having a radius smaller than said predetermined distance and having an engraved surface, said device comprising an auxiliary turn-table and an auxiliary turn-table drive means rotatably driven by said axle to in turn drive said auxiliary turn-table, said auxiliary turn-table being maintained above the first-named turn-table by a support in a radially off-set position with respect to said axle such that at least a part of the engraved surface of said phonograph record is located in the sector swept by said pick-up arm in normal operation and that said support is mounted on the axle of said first-named turn-table by said auxiliary turn-table drive means and is supported beyond the periphery of the first-named turn-table upon said mounting plate of said record player.

2. A device according to claim 1, wherein said support exhibits the general shape of a plate comprising a bearing through which the shaft of said first-named turn-table freely extends and in which is journalled the hub of a pulley constituted by said auxiliary turn-table drive means secured onto the shaft, through which pulley said auxiliary turn-table is drivingly rotated.

3. A device according to claim 2, wherein said pulley drivingly rotates said auxiliary turn-table through the medium of a belt.

4. A device according to claim 3, wherein said pulley and said turn-table have the same diameter.

5. A device according to claim 3, wherein said support bears upon the mounting plate of said apparatus through the medium of a stand of adjustable height.

6. A device according to claim 2, wherein said support bears upon the mounting plate of said apparatus through the medium of a stand of adjustable height.

7. A device according to claim 2, wherein said support is provided with a cover covering at least said pulley and the free runs of said belt.

* * * * *